(12) United States Patent
Isaksson et al.

(10) Patent No.: US 8,565,249 B2
(45) Date of Patent: Oct. 22, 2013

(54) QUEUE MANAGEMENT SYSTEM AND METHODS

(75) Inventors: Martin Isaksson, Stockholm (SE); Hannes Ekstrom, Stockholm (SE); Malin Ljungberg, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 900 days.

(21) Appl. No.: 12/368,723

(22) Filed: Feb. 10, 2009

(65) Prior Publication Data

US 2010/0202469 A1 Aug. 12, 2010

(51) Int. Cl.
H04L 12/28 (2006.01)
H04L 12/54 (2013.01)

(52) U.S. Cl.
USPC .......................... 370/412; 370/429

(58) Field of Classification Search
USPC .......................... 370/412, 428, 429
See application file for complete search history.

(56) References Cited

U.S. PATENT DOCUMENTS

| | | | | |
|---|---|---|---|---|
| 5,339,311 A * | 8/1994 | Turner | ............ | 370/394 |
| 5,379,297 A * | 1/1995 | Glover et al. | ............ | 370/234 |
| 5,918,182 A * | 6/1999 | Korus et al. | ............ | 455/517 |
| 6,108,307 A * | 8/2000 | McConnell et al. | ............ | 370/235 |
| 6,597,669 B1 * | 7/2003 | Takahashi et al. | ............ | 370/325 |
| 6,622,172 B1 * | 9/2003 | Tam | ............ | 709/232 |
| 7,606,177 B1 * | 10/2009 | Mahajan et al. | ............ | 370/256 |
| 7,689,162 B2 * | 3/2010 | Thesling | ............ | 455/3.02 |
| 7,768,923 B2 * | 8/2010 | Kumar et al. | ............ | 370/235 |
| 2003/0223422 A1 * | 12/2003 | Igarashi et al. | ............ | 370/390 |
| 2004/0218617 A1 * | 11/2004 | Sagfors | ............ | 370/412 |
| 2005/0254447 A1 * | 11/2005 | Miller-Smith | ............ | 370/315 |
| 2006/0045011 A1 * | 3/2006 | Aghvami et al. | ............ | 370/230 |
| 2007/0091799 A1 * | 4/2007 | Wiemann et al. | ............ | 370/230 |
| 2007/0116152 A1 * | 5/2007 | Thesling | ............ | 375/326 |
| 2007/0183378 A1 * | 8/2007 | Passarella et al. | ............ | 370/338 |
| 2007/0258375 A1 * | 11/2007 | Belanger et al. | ............ | 370/237 |
| 2008/0037420 A1 * | 2/2008 | Tang | ............ | 370/229 |
| 2008/0192634 A1 * | 8/2008 | Kumar et al. | ............ | 370/235 |
| 2008/0195745 A1 * | 8/2008 | Bowra et al. | ............ | 709/231 |
| 2008/0239953 A1 * | 10/2008 | Bai et al. | ............ | 370/231 |

(Continued)

FOREIGN PATENT DOCUMENTS

WO 2008076017 A1 6/2008

OTHER PUBLICATIONS

Sarolahti, P., "Congestion Control in Linux TCP" in Proceedings of the FREENIX Track: 2002 USENIX Annual Technical Conference, Jun. 2002, 15 pages.

Allman, M., et al. Standards Track, "TCP Congestion Control", Apr. 1999, 14 pages.

(Continued)

Primary Examiner — Ayaz Sheikh
Assistant Examiner — Hoang-Chuong Vu
(74) Attorney, Agent, or Firm — Rothwell, Figg, Ernst & Manbeck, P.C.

(57) ABSTRACT

A system and method are provided for managing a queue of packets transmitted from a sender to a receiver across a communications network. The sender has a plurality of sender states and a queue manager situated in between the sender and receiver may have a corresponding plurality of queue manager states. The queue manager has one or more queue management parameters which may have distinct predetermined values for each of the queue manager states. When the queue manager detects an event that is; indicative of a change in the sender's state, the queue manager may change its sn tate correspondingly.

40 Claims, 9 Drawing Sheets

(56) References Cited

U.S. PATENT DOCUMENTS

| | | | |
|---|---|---|---|
| 2008/0240106 A1* | 10/2008 | Schlenk | 370/392 |
| 2010/0118768 A1* | 5/2010 | Thesling | 370/316 |
| 2010/0172234 A1* | 7/2010 | Thesling | 370/206 |
| 2010/0195494 A1* | 8/2010 | Sun et al. | 370/230 |
| 2011/0222402 A1* | 9/2011 | Gai et al. | 370/230.1 |

OTHER PUBLICATIONS

Ekstrom, H., Ericsson Research, "Queue Management in 3rd Generation Wireless Networks" 2003, 22 pages.

Stevens, W.R., TCP/IP Illustrated, vol. 1, The Protocols, 1994, Chapters 20 and 21, pp. 275-322.

\* cited by examiner

QUEUE MANAGEMENT SYSTEM AND METHODS

TECHNICAL FIELD

The present invention relates to the field of communications. More specifically, aspects of the present invention relate to systems and methods for queueing packets in transit across a communications network.

BACKGROUND

The Transmission Control Protocol (TCP) is one of the most commonly used transport protocols in Internet Protocol (IP) based communication networks, such as the Internet. TCP provides reliability on top of the unreliable IP protocol, in-order delivery of data, and a network congestion control mechanism. TCP is the primary end-to-end transport layer protocol in the Internet for non-real time data including data arising from, for example, web browsing, file-downloading and e-mail applications.

TCP is a sliding window protocol; the sender's window, or what it is allowed to send, is based on the receiver's offered window (rwnd) and a congestion window (cwnd) calculated by the sender using a congestion control algorithm. The size of the TCP sender's window is defined as the minimum of the receiver's window (rwnd) and the congestion window (cwnd).

When the sender receives an acknowledgement (ACK) from the receiver, the sender can transmit as many new segments as were acknowledged. The newly transmitted segments will be acknowledged at a later time. The spacing of the ACKs will determine the rate at which new packets are sent. This property is known as self-clocking. The rate at which the packets flow through the downlink pipe is also the rate at which the ACKs are sent back to the sender.

The maximum amount of data that can be in transit across a connection between two endpoints of a network at any one time is referred to as the "pipe capacity" of that connection. The pipe capacity is equal to the maximum connection bandwidth or "bottleneck rate" (measured, for example, in bits per second) multiplied by the transmission delay of the connection (measured, for example, in seconds). For bidirectional communications, the transmission delay may represent the round trip time of the connection (i.e., the sum of the delays in each direction).

An end-point in the network cannot know the true maximum connection bandwidth or latency for the connection and therefore cannot know the pipe capacity. Instead the end-point has to determine the pipe capacity and therefore the bottleneck rate based upon the observed rate of successful packet transmission. When an ACK is received, it is a signal that a packet was successfully transmitted and that more bandwidth is available. When a packet is dropped, it is a signal of light congestion. When there are many packet drops or a time-out, it is a signal of serious congestion. TCP acts on these events by changing its send window or by starting over using the initial settings.

Congestion control in TCP is comprised of four intertwined algorithms, the slow-start algorithm, congestion avoidance algorithm, fast-retransmit algorithm, and fast-recovery algorithm. The slow-start algorithm and the congestion avoidance algorithm are independent algorithms with different objectives, although in practice they are implemented together.

The Active Queue Management (AQM) algorithm, which is typically implemented in a store and forward node (e.g., a router, gateway or other store and forward node) between two endpoints, makes use of the TCP congestion avoidance algorithm to limit the congestion window by occasionally dropping a TCP packet. A smaller congestion window leads to smaller amounts of buffered data, and thus also a smaller delay. AQM can also be used for other transmission protocols, including, but not limited to, User Datagram Protocol (UDP) and Real-time Transport Protocol (RTP).

The delay based AQM algorithm uses a Minimum Age Threshold parameter that defines the minimum queuing delay that a packet must have experienced at the store and forward node before it may be dropped. The Minimum Age Threshold parameter is an important parameter from a performance perspective. When setting this parameter, there is a tradeoff between low queuing delays (i.e., few packets in the queue) and link utilization or throughput performance (i.e., there should never be so little data in the queue that the queue runs empty, since that will result in a throughput degradation). For example, setting the Minimum Age Threshold parameter to a low value will result in lowering the average queue size, resulting in smaller queuing delays. However, this means that the risk of getting an empty buffer increases (resulting in lower throughput). Moreover, setting the Minimum Age Threshold parameter to a higher value will result in increasing the average queue size, resulting in greater queuing delays.

The Minimum Age Threshold parameter should ideally be set to reflect the pipe capacity. When expressed in time, an ideal setting for the Minimum Age Threshold is the round-trip time (RTT) seen by the TCP flow in a system without queuing delays. Since it is difficult for the AQM algorithm to know the RTT, it has to be estimated.

The delay-based AQM algorithm described above can result in a TCP timeout, which can degrade the TCP performance, when the sender transitions between slow-start algorithm and the congestion avoidance algorithm. Accordingly, what is desired is an improved queue management system and method to overcome this and/or other disadvantages of the prior art.

SUMMARY

Aspects of the invention provide a queue management algorithm for managing a queue of packets transmitted by a sender in which one or more parameters of the queue management algorithm are adjusted to correspond with predicted or sensed changes in the state of the sender.

Thus, in one aspect, the invention provides a queue management method. In some embodiments, the queue management method includes the following steps: (1) initializing a queue for queuing packets (e.g., transmission control protocol (TCP) packets) transmitted from a communication device, wherein the step of initializing the queue comprises setting a queue management parameter equal to a first value; (2) while the queue management parameter is equal to the first value, using the queue management parameter in a queue management process for managing the queue; (3) in response to the detection of a first predetermined event, setting the queue management parameter equal to a second value (e.g., a value greater than the first value), wherein the step of detecting the first predetermined event comprises: (a) detecting that a packet transmission process executing in the communication device has transitioned or will transition from a first state to a second state or (b) detecting an event that suggests the packet transmission process has transitioned or will transition from the first state to the second state; and (4) while the queue management parameter is equal to the second value, using the queue management parameter in the queue management process for managing the queue. In some embodiments, the second value is two times greater or about two times greater than the first value.

In some embodiments, the step of detecting an event that suggests the packet transmission process will transition from the first state to the second state comprises determining whether a packet has been dropped from the queue. In some embodiments, the step of detecting an event that suggests the packet transmission process has transitioned from the first state to the second state comprises determining whether the rate at which packets are arriving at the queue is increasing linearly.

In some embodiments, the queue management method also includes the steps of: (5) in response to the detection of a second predetermined event, setting the queue management parameter equal to the first value; and (6) after the detection of the second predetermined event and while the queue management parameter is equal to the first value, using the queue management parameter in the queue management process.

In some embodiments, the step of detecting the second predetermined event comprises: (a) detecting that the packet transmission process has transitioned or will transition back to the first state or (b) detecting an event that suggests the packet transmission process has transitioned or will transition back to the first state. The step of detecting an event that suggests the packet transmission process has transitioned from the second state to the first state may consist of detecting a certain amount of queue inactivity. In some embodiments, the step of detecting an event that suggests the packet transmission process has transitioned back to the first state comprises determining whether the rate at which packets are arriving at the queue is increasing exponentially.

In some embodiments, the step of using the queue management parameter in the queue management process comprises using the queue management parameter in deciding whether a packet in the queue should be dropped from the queue. In these embodiments, the step of using the queue management parameter in deciding whether a packet in the queue should be dropped from the queue may include the following steps: (i) determining a time value representing the length of time the packet has been in the queue and (ii) comparing the time value to the value of the queue management parameter. In some embodiments, the packet is dropped from the queue in response to the result of the comparing step indicating that the time value is greater than the value of the queue management parameter.

In some embodiments, the step of initializing the queue further comprises: (i) setting a second queue management parameter equal to a third value and (ii) setting a third queue management parameter equal to a fourth value. In such embodiments, the method may also include the steps of: (a) using the first, second and third queue management parameters in deciding whether a packet in the queue should be dropped from the queue while the first queue management parameter is equal to the first value, the second queue management parameter is equal to the third value, and the third queue management parameter is equal to the fourth value; (b) setting the second queue management parameter equal to a fifth value and setting the third queue management parameter equal to a sixth value in response to the detection of the first predetermined event; and (c) using the first, second and third queue management parameters in deciding whether a packet in the queue should be dropped from the queue while the first queue management parameter is equal to the second value, the second queue management parameter is equal to the fifth value, and the third queue management parameter is equal to the sixth value.

In some embodiments, the queue management method also includes the steps of: (5) in response to the detection of a second predetermined event, setting the queue management parameter equal to a third value; and (6) after the detection of the second predetermined event and while the queue management parameter is equal to the third value, using the queue management parameter in the queue management process.

In some embodiments, the step of detecting the second predetermined event comprises: (a) detecting that the packet transmission process has transitioned or will transition from the second state to a third state or (b) detecting an event that suggests the packet transmission process has transitioned or will transition from the second state to a third state.

In another aspect, the invention provides a network node for queuing packets received from a communication device. In some embodiments, the network node includes: (1) a packet queue for storing packets (e.g., transmission control protocol (TCP) packets); and (2) a queue manager configured to manage the queue, wherein the queue manager is configured to: (a) initialize the queue, wherein as part of initializing the queue the queue manager is configured to set a queue management parameter equal to a first predetermined value; (b) use the queue management parameter in a queue management process for managing the queue while the queue management parameter is equal to the first value; (c) set the queue management parameter equal to a second predetermined value in response to the detection of a first predetermined event, wherein the queue manager is configured to detect the first predetermined event by (i) detecting that a packet transmission process executing in the communication device has transitioned or will transition from a first state to a second state or (ii) detecting an event that suggests the packet transmission process has transitioned or will transition from the first state to the second state; and (d) use the queue management parameter in the queue management process while the queue management parameter is equal to the second value.

In another aspect, the invention provides a computer program product comprising a computer usable medium having a computer readable program code embodied therein, said computer readable program code adapted to be executed to implement a method for managing a queue. In some embodiments, the method includes the steps of: (1) initializing a queue for queuing packets transmitted from a communication device, wherein the step of initializing the queue comprises setting a queue management parameter equal to a first value; (2) while the queue management parameter is equal to the first value, using the queue management parameter in a queue management process for managing the queue; (3) in response to the detection of a first predetermined event, setting the queue management parameter equal to a second value, wherein detecting the first predetermined event comprises (a) detecting that a packet transmission process executing in the communication device has transitioned or will transition from a first state to a second state or (b) detecting an event that suggests the packet transmission process has transitioned or will transition from the first state to the second state; and (4) while the queue management parameter is equal to the second value, using the queue management parameter in the queue management process for managing the queue.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

One aspect of the invention involves setting one or more parameters of a queue manager in dependence on an assumed or detected state of a sending entity whose packets are queued in a queue managed by the queue manager.

Figure 1:
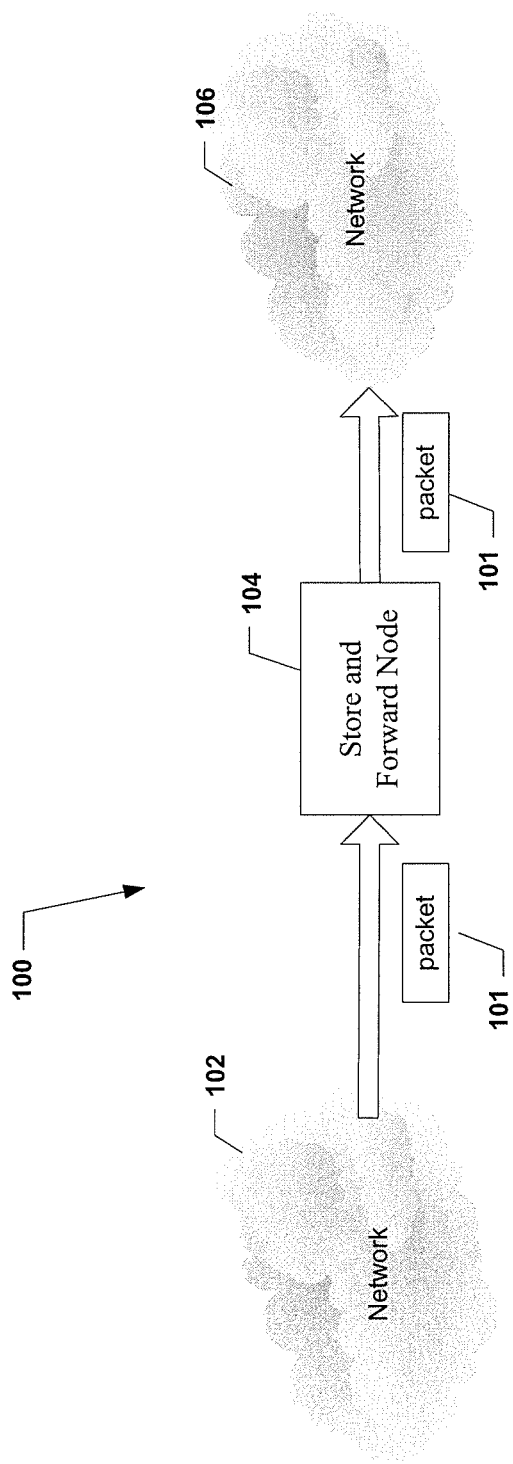
FIG. 1 illustrates a communication network having a store and forward node.

Referring now to FIG. 1, FIG. 1 illustrates a communication network 100. As shown in FIG. 1, the communications network 100 includes: a first network 102, a second network 106, and a store and forward node 104 connected to the first network 102 and the second network 106. The store and forward node 104 is configured to transmit data packets 101 between a sender within network 102 and a receiver within network 106.

Figure 2:
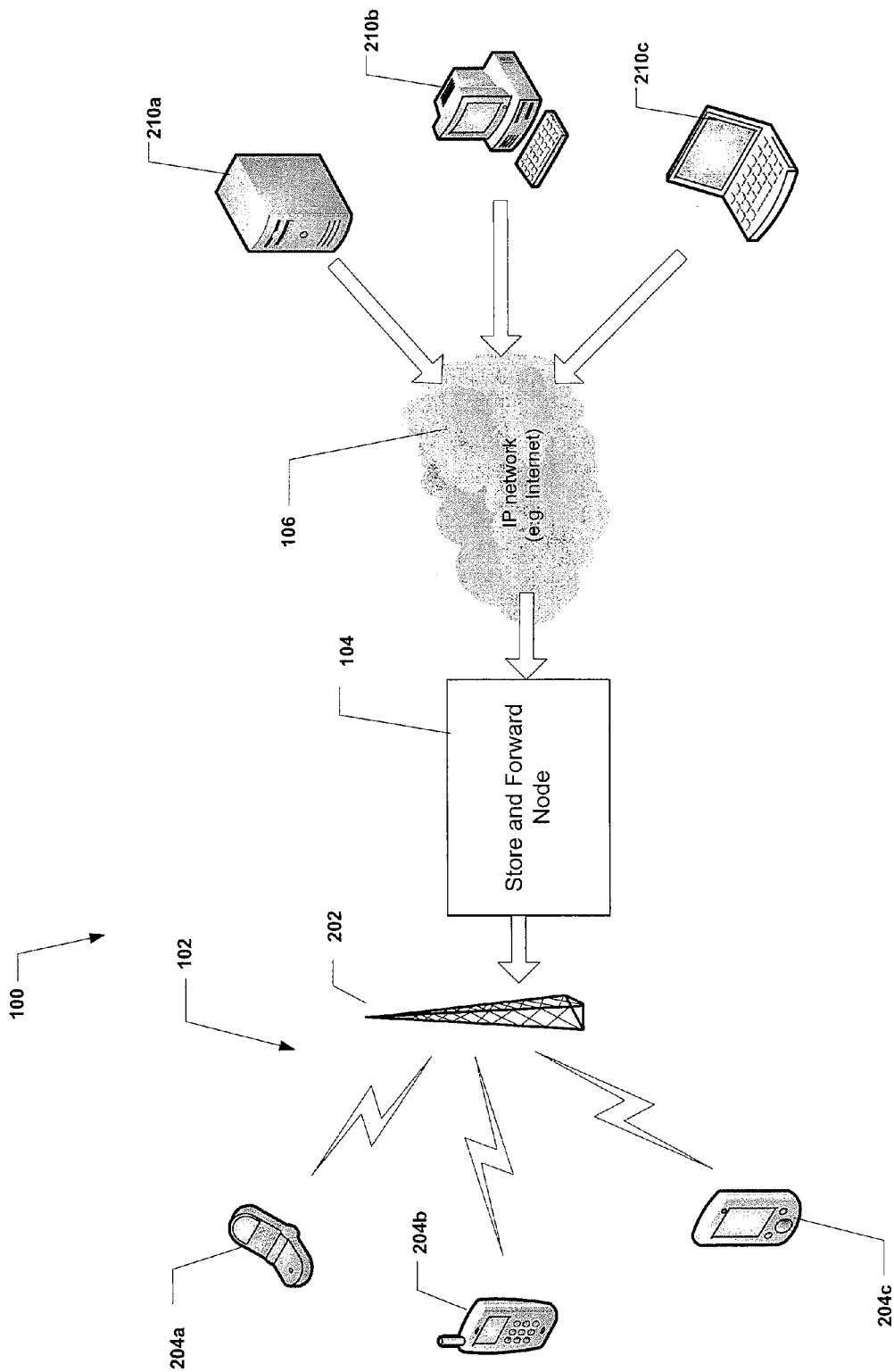
FIG. 2 illustrates a communication network having a store and forward node.

Referring now to FIG. 2, FIG. 2 illustrates a specific embodiment of communication network 100. As shown in FIG. 2, network 102 may comprise a wireless base station 202 in communication with a plurality of portable communication devices 204 (e.g. a cellular handset 204a, a smart phone 204b, a personal digital assistant 204c, and the like). Also as shown in FIG. 2, the second network portion 106 may comprise an IP-based network (e.g. the Internet) in communication with a plurality of communication devices 210 (e.g., a computer configured as a server 210a, a personal computer 210b, a laptop computer 210c, and the like).

Alternatively, the store and forward node 104 may be configured to transmit data packets 101 between a sender within the network portion 106 and a receiver within the network portion 102. Furthermore, the store and forward node 104 may be configured to permit bidirectional communication between a communication device within the first network portion and a communication device within the second network portion, wherein both communication devices are configured to send and receive packets.

Figure 3:
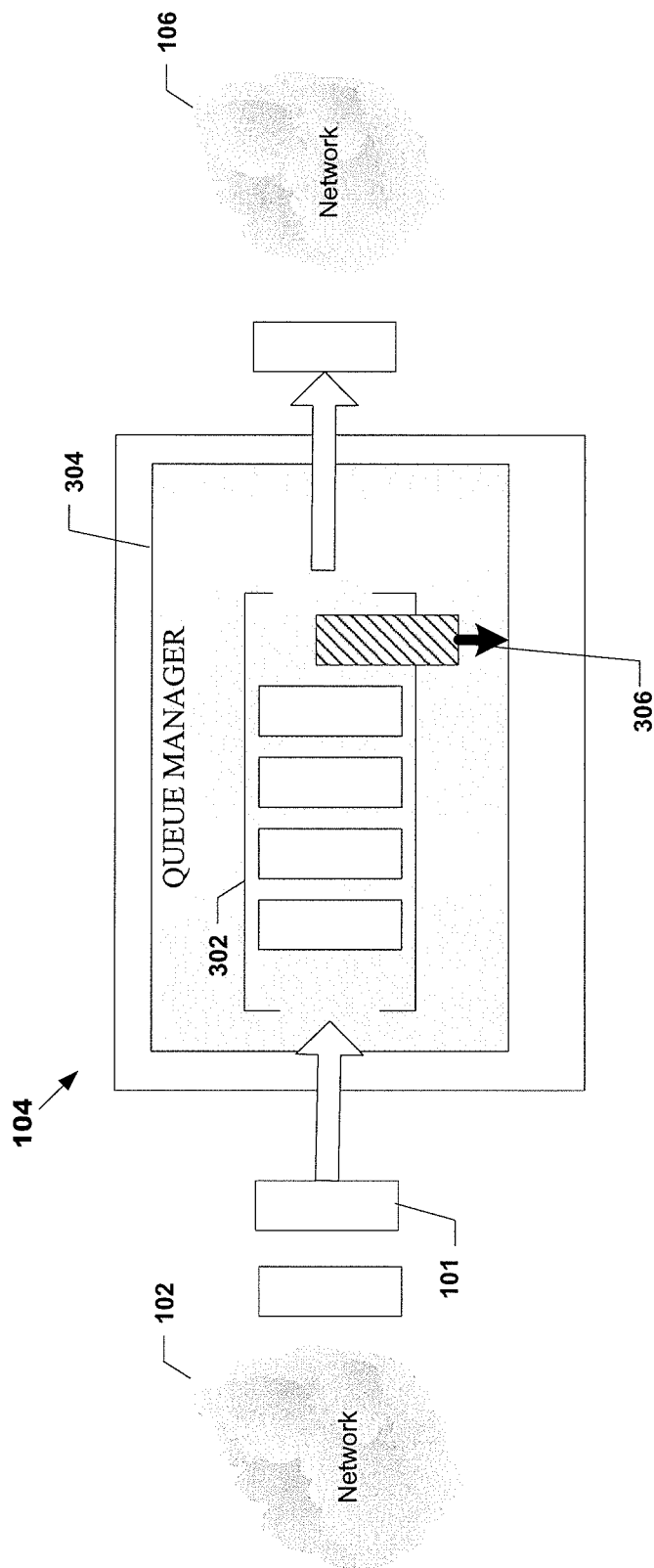
FIG. 3 is a block diagram of a store and forward node.

Referring now to FIG. 3, FIG. 3 illustrates one embodiment of a store and forward node 104. As shown in FIG. 3, the store and forward node 104 includes a queue 302 for temporarily storing packets 101 in transit between the networks 102, 106, and a queue manager 304. In some embodiments, a function of the queue manager 304 may be to drop packets from the queue without transmitting them, for example as illustrated at 306. In some embodiment, queue 302 is used for storing packets transmitted only from a single sending communication device or for storing packets transmitted only from a single connection (e.g., TCP connection).

Figure 4:
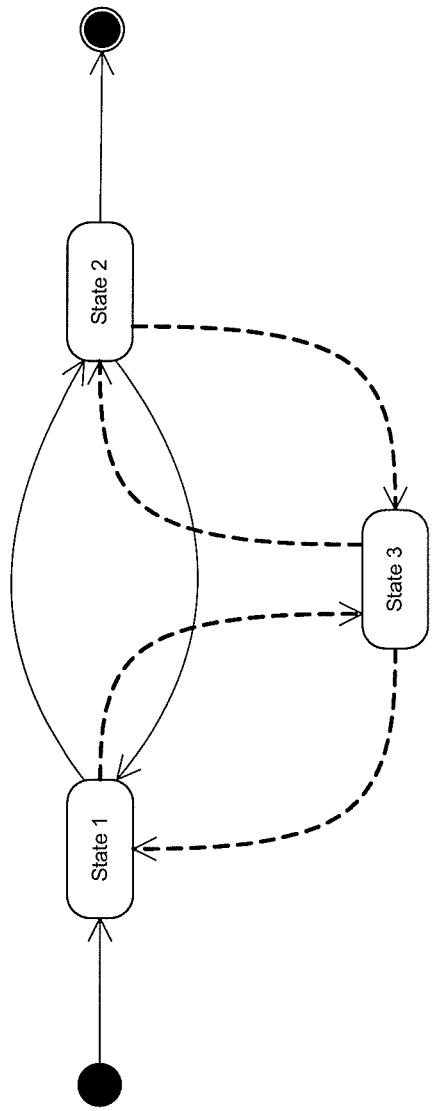
FIG. 4 is a state diagram of one embodiment of a queue manager.

Referring now to FIG. 4, FIG. 4 illustrates a state diagram for queue manager 304 according to some embodiments. As shown in FIG. 4, when a queue 302 is initialized, the queue manager begins in State 1. While the queue manager is in State 1, one or more parameters that affect the behavior of the queue manager 304 ("queue management parameters") are set to their respective State 1 values. The queue manager 304 will manage the queue 302 in accord with the queue management parameters' State 1 values until the detection of a predetermined event. In the case that a first event is detected, the queue manager 304 will transition to from State 1 to State 2. Alternatively, in the case that a second event is detected, the queue manager 304 will transition to from State 1 to State 3.

While the queue manager is in State 2, the queue management parameters are set to their respective State 2 values. The queue manager 304 will manage the queue 302 in accord with the queue management parameters' State 2 values until the detection of a predetermined event. In the case that a third event is detected, the queue manager 304 will transition to from State 1 to State 3. Alternatively, in the case that a fourth event is detected, the queue manager 304 will transition to from State 1 to State 2.

While the queue manager is in State 3, the queue management parameters are set to their respective State 3 values. The queue manager 304 will manage the queue 302 in accord with the queue management parameters' State 3 values until the detection of a predetermined event. In the case that a fifth event is detected, the queue manager 304 will transition to from State 3 to State 1. Alternatively, in the case that a sixth event is detected, the queue manager 304 will transition to from State 3 to State 2.

While the foregoing has described a queue manager 304 with three states and transitions between each state, aspects of the invention include queue managers with an arbitrary number of states and permissible state transitions. One goal when defining the states for the queue manager 304 and the transition events is to predict or detect the state of the sender based on measurements or observations. Therefore, the number of states for the queue manager 304 may be selected to correspond with the number of states for the sender. Furthermore, the transition events may be selected to be indicative of a change in the state of the sender. One method of doing this is through deep packet inspection (DPI), so that data packets are analyzed to determine the current protocol state. Thus aspects of the invention are applicable to transmission protocols having an arbitrary number of states.

Figure 5:
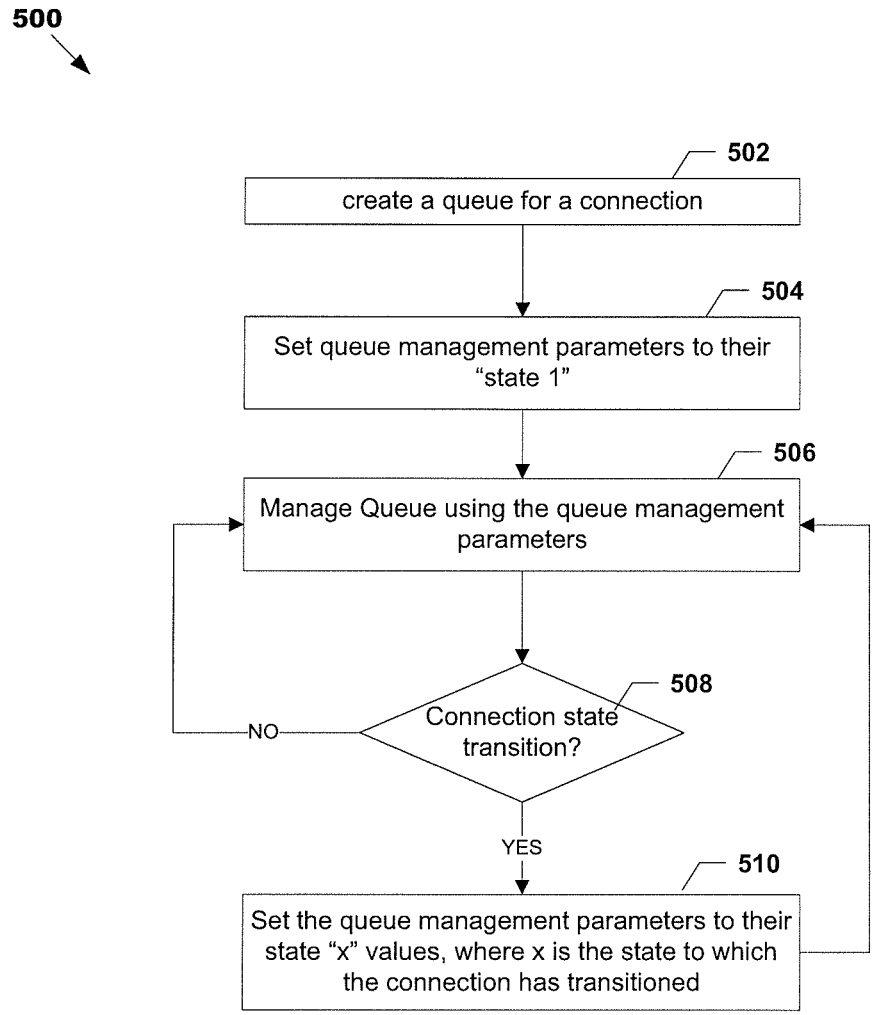
FIG. 5 is a flow chart illustrating a process for managing a queue.

Referring now to FIG. 5, FIG. 5 is a flow chart illustrating process 500, according to some embodiments, that may be implemented by queue manager 304. Process 500 may begin in step 502, where a new queue 302 is created to store packets being transmitted from a sender to a receiver. As mentioned above, queue 302 may be created to store only packets that are transmitted by the sender or that are packets associated with a single connection (e.g., TCP connection) initiated or terminated by the sender.

In step 504, queue manager 304 enters a first state (i.e., State 1). This comprises setting queue management parameters to their State 1 values. In step 506, the queue manager 304 manages the queue 302 using the current values of the queue management parameters.

At step 508, the queue manager 304 determines whether the state of the sender has changed. This comprises detecting a predetermined event that would be indicative of a change in the sender's state. If the predetermined event is detected, the queue management process 500 proceeds to step 510. Otherwise, if the predetermined event is not detected, the queue management process proceeds back to step 506.

In response to detecting the predetermined event, the state of the queue manager 304 will change from its current state to a new state. The new state is depending upon, at the least, the predetermined event that was detected. In particular embodiments, the new state of the queue manager may correspond with a new state of the sender that is predicted from the detected event. The queue management parameters are set to values corresponding with the selected new state (step 510). After the state of the queue manager 304 has been thus updated, process 500 returns to step 506.

Figure 6:
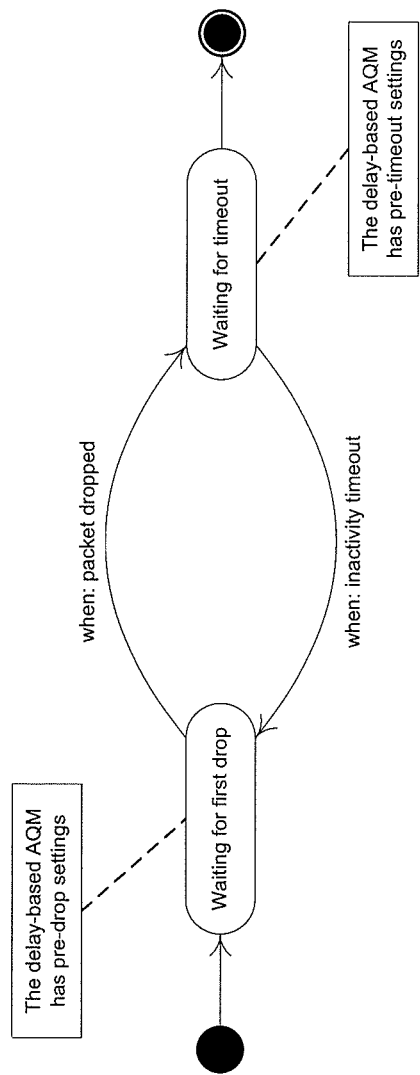
FIG. 6 is a state diagram of one embodiment of a queue manager.

Referring now to FIG. 6, FIG. 6 illustrates a state diagram for a queue manager 304 according to another embodiment. As shown in FIG. 6, when a queue 302 is initialized, the queue manager 304 begins in a waiting for a first dropped packet ("pre-drop") state. This state corresponds with an inference that the sender is in the slow-start mode of a TCP connection. While the queue manager 304 is in the pre-drop state, one or more queue management parameters (e.g. the Minimum Age Threshold, a Maximum Age Threshold, a Lower Drop Threshold, and a Minimum Inter Drop Time Threshold) are set to their respective pre-drop values.

The queue manager 304 will manage the queue 302 in accord with pre-drop values until the queue manager 304 drops a first packet 101. In response to a first packet 101 being dropped by the queue manager 304, the queue manager 304 will transition to a waiting for the connection to timeout ("pre-timeout") state, corresponding with an inference that the sender will transition to the congestion avoidance mode of the TCP connection after it detects that a packet has been dropped.

While the queue manager 304 is in the pre-timeout state, the queue management parameters are set to their respective pre-timeout values. The queue manager 304 will manage the queue 302 in accord with the pre-timeout values until the connection is inactive for a predetermined period of time (i.e., no data packets are received for a predetermined period of time). In response to detecting that the connection has been inactive for a predetermined period of time, the queue manager 304 will transition to the pre-drop state (i.e., the queue management parameters are set to their respective pre-drop values), corresponding with an inference that the sender has transitioned to the slow-start mode of the TCP connection when the connection is inactive for the predetermined period of time.

In some embodiments, a queue parameter's pre-drop value is equal to one-half of the queue parameters pre-timeout value. For example, if the Minimum Age Threshold and Maximum Age threshold are set to values of 4 and 6, respectively, while the queue manager 304 is in the pre-timeout state, then when the queue manager 304 is in the pre-drop state the Minimum Age Threshold may be set to a value of 2 and the Maximum Age Threshold may be set to a value of 3.

Figure 7:
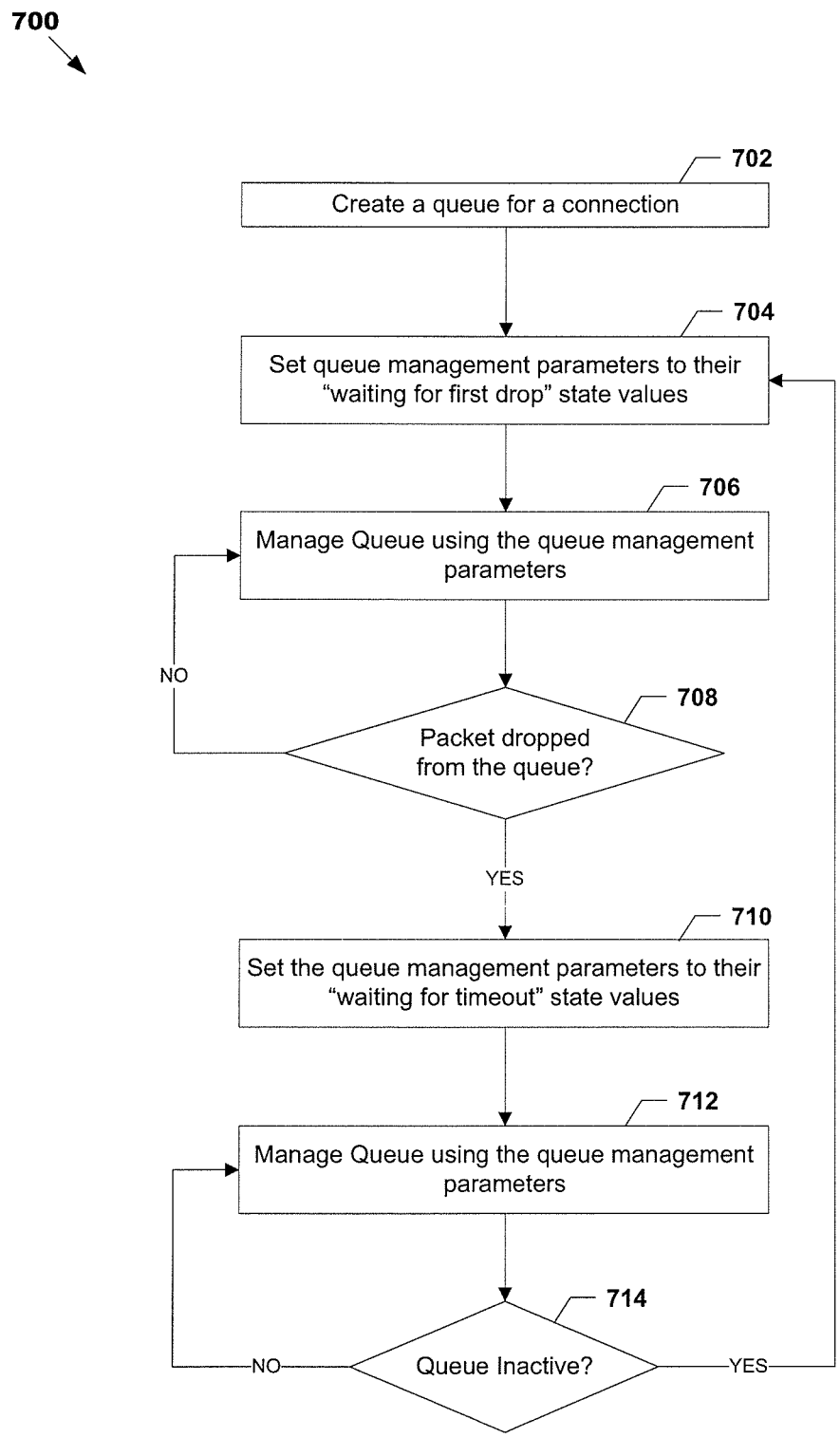
FIG. 7 is a flow chart illustrating a process for managing a queue.

Referring now to FIG. 7, FIG. 7 is a flow chart illustrating process 700, according to some embodiments, that may be implemented by queue manager 304. Process 700 may begin in step 702, where a new queue 302 is created to store packets being transmitted from a sender to a receiver. As mentioned above, queue 302 may be created to store only packets that are transmitted by the sender or that are packets associated with a single connection (e.g., TCP connection) initiated or terminated by the sender. In step 704, the queue manager 304 is set to the pre-drop state. This comprises setting the queue management parameters (e.g., Minimum Age Threshold, Maximum Age Threshold, Lower Drop Threshold and Minimum Inter-Drop Time Threshold) to their respective pre-drop values. In step 706, the queue manager 304 manages the queue 302 using the pre-drop values of the queue management parameters.

At step 708, the queue manager 304 determines whether the state of the sender (e.g., the state of a packet transmission process in the sender) is in the congestion avoidance state or will transition to the congestion avoidance state or detects an event suggesting that the sender is in the congestion avoidance state or will transition to the congestion avoidance state. In some embodiments, the step of detecting an event suggesting that sender will transition to the congestion avoidance state consists of determining that a packet 101 has been dropped from the queue 302. In other embodiments, the step of detecting an event suggesting that sender is currently in the congestion avoidance state includes determining the change in the rate at which packets arrive at the queue during a measurement period. For example, if it is determined that the rate is increasing linearly during the measurement period, then this suggests that the sender is in the congestion avoidance state. If a packet has been dropped, process 700 proceeds to step 710. Otherwise, if no packets have been dropped, process proceeds back to step 706. In other embodiments, for example the embodiment in which the step of detecting an event suggesting that sender is currently in the congestion avoidance state includes determining the change in the rate at which packets arrive at the queue during a measurement period, process 700 may proceed to step 710 even if a packet has not been dropped (e.g., process may proceed to step 710 upon the detection of any event that suggests the sender is in the congestion avoidance state).

In response to detecting that a packet 101 has been dropped at step 708, queue manager 304 transitions to the pre-timeout state (i.e., queue manager 304 sets the queue management parameters to their respective pre-timeout values). After the queue management parameters have been updated, process 700 proceeds to step 712. In step 712, the queue manager 304 manages the queue 302 using the pre-timeout values of the queue management parameters.

Figure 8:
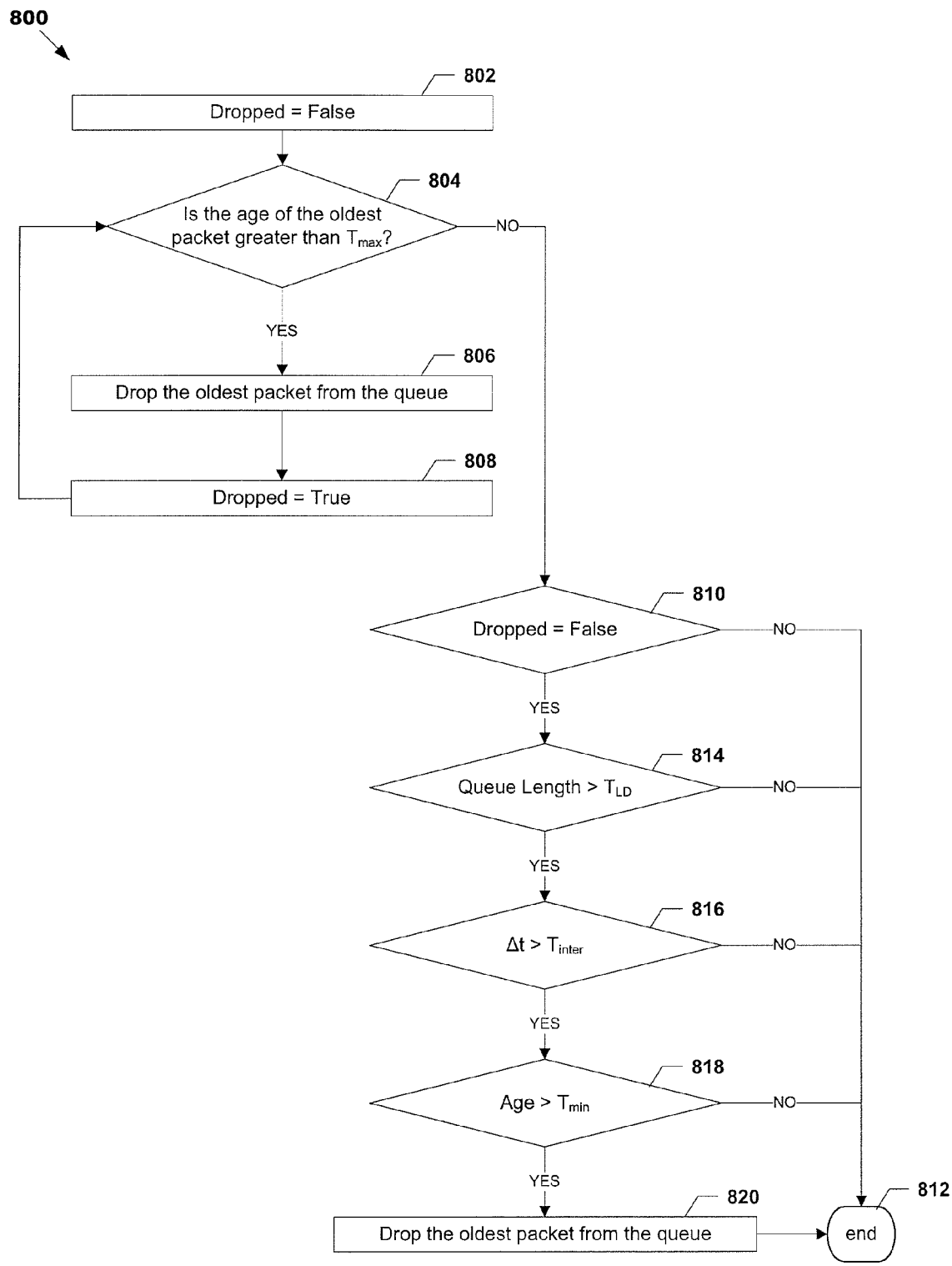
FIG. 8 is a flow chart illustrating a process for dropping packets from a queue.

At step 714, the queue manager 304 determines whether the sender is currently in the slow-start state or detects an event suggesting that the sender is currently in the slow-start state. In some embodiments, the step of detecting an event suggesting that the sender is currently in the slow-start state consists of detecting whether the queue 302 has been inactive for a predetermined period of time. If the queue 302 has been inactive for the predetermined period of time, process 700 proceeds to step 704. Otherwise, if the queue has not been inactive for the predetermined period of time, process 700 proceeds back to step 712. In other embodiments, the step of detecting an event suggesting that the sender is currently in the slow-start state includes determining the change in the rate at which packets arrive at the queue during a measurement period. For example, if it is determined that the rate is increasing exponentially during the measurement period, then this suggests that the sender is in the slow-start state Referring now to FIG. 8, FIG. 8 is a flow chart illustrating process 800 for managing a queue by selecting packets to drop according to an embodiment of the delay-based Active Queue Management algorithm. That is, process 800 may be performed by queue manger 304 when queue manager 304 performs steps 506, 706 and 712. As shown in FIG. 8, the process 800 may begin in step 802, in which a variable Dropped, representing whether this instance of process 800 has caused any packets to be dropped from the queue, is set to FALSE. After this variable is initialized, process 800 may proceed to step 804.

At step 804, the age of the oldest packet in the queue 302 is checked. If that packet has been in the queue for a period of time greater than the Maximum Age Threshold ($T_{max}$), the queue management process 800 will proceed to step 806. Otherwise, no packet has been in the queue 302 longer than $T_{max}$ and the queue management process will proceed to step 810.

In the case that the queue management process 800 determined that the age of the oldest packet in the queue 302 is greater than $T_{max}$, at step 806 that packet is dropped from the queue 392.

After a packet is dropped from the queue 302 at step 806, the queue management process 800 will set the variable Dropped to TRUE indicating that the queue management process 800 has caused at least one packet to be dropped. Afterward, the queue management process 800 will proceed to step 804.

In the case that that the queue management process 800 determined that none of the packets remaining in the queue 302 are older than $T_{max}$, queue management process proceeds to step 810. At step 810, queue management process 800 checks the value of the variable Dropped. If this instance of the queue management process 800 has already dropped any packets (e.g. at step 806), it will proceed to step 812 and terminate. If the queue management process has not dropped any packets yet, it will proceed to step 814.

At step 814, the queue management process checks whether the current length of the queue is greater than the Lower Drop Threshold ($T_{LD}$). If the current length of the queue is not above $T_{LD}$, queue management process 800 will proceed to step 812 and terminate. If the current length of the queue is greater than $T_{LD}$, queue management process 800 will proceed to step 816.

At step 816, the queue management process determines the amount of time that has elapsed since the last packet was dropped ($\Delta t$). If $\Delta t$ is not above the Minimum Inter Drop Time ($T_{inter}$), queue management process 800 will proceed to step 812 and terminate. If $\Delta t$ is greater than $T_{inter}$, queue management process 800 will proceed to step 818.

At step 818, the age of the oldest packet in the queue 302 is checked. If that packet has been in the queue for a period of time greater than a Minimum Age Threshold ($T_{min}$), queue management process 800 will proceed to step 812 and terminate. If the age of the oldest packet is greater than $T_{min}$, queue management process 800 will proceed to step 818.

At step 820, after queue management process 800 has determined that no packets have been dropped by this instance of the process, the current queue length is greater than the Lower Drop Threshold, the amount of time elapsed since the last packet was dropped is greater than the Minimum Inter Drop Time, and the age of the oldest remaining packet is greater than the Minimum Age Threshold, the oldest packet remaining in the queue will be dropped. After this packet is dropped, queue management process 800 will proceed to step 812 and terminate.

In some aspects of the invention, the queue manager 304 implements the delay-based AQM algorithm and the queue management parameters comprise at least one of the Minimum Age Threshold, the Minimum Inter Drop Time, and the Maximum Age Threshold. The values for one or more of these parameters may be set to one half of ideal values when the manager in the first state corresponding to the connection being in the slow-start state. The values for one or more these parameters may be set to ideal values when the manager in the second state corresponding to the connection being in the congestion avoidance state. It should be noted that this invention is applicable for any AQM algorithm regardless of the nature of the parameters.

Figure 9:
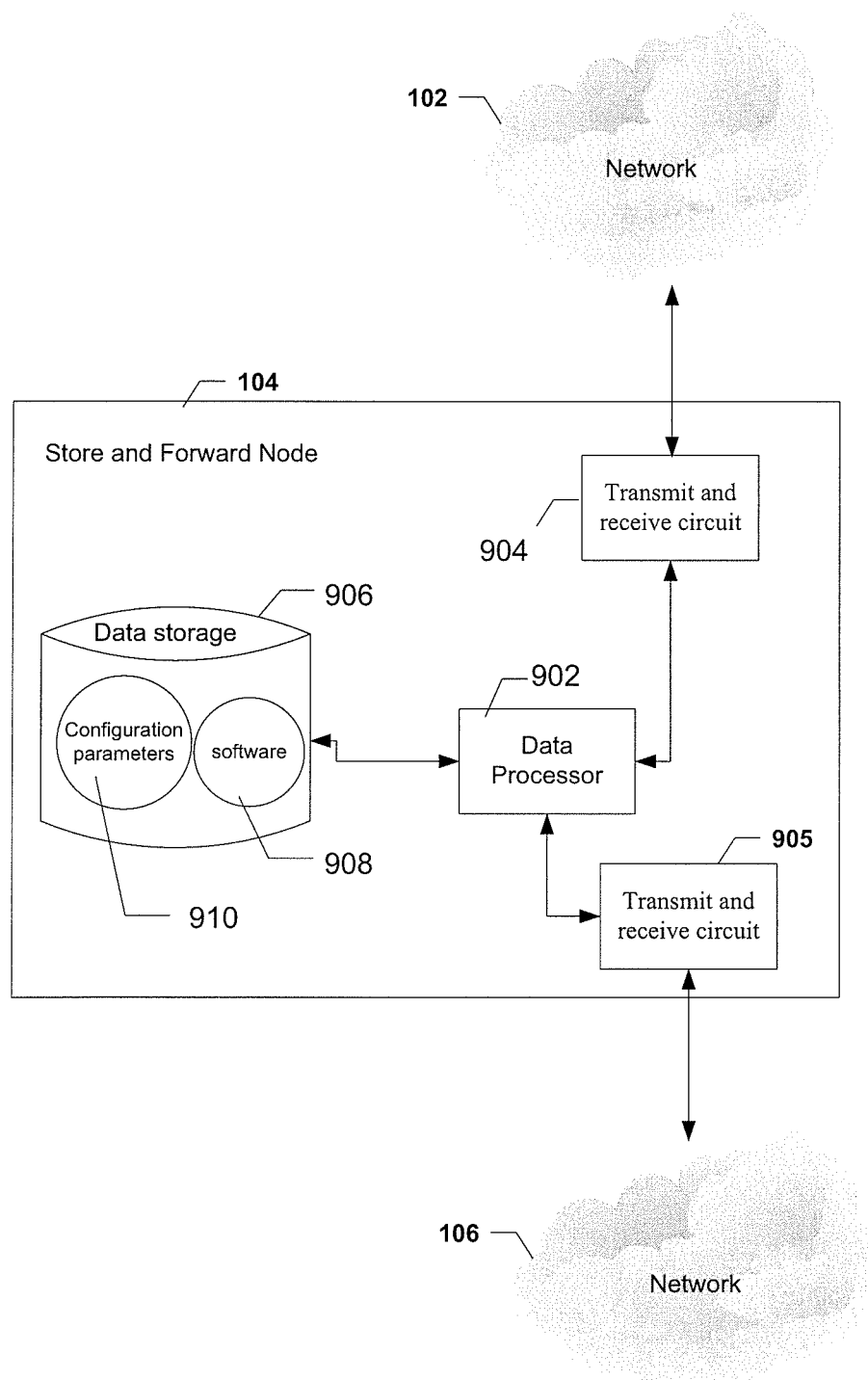
FIG. 9 illustrates an embodiment of a store and forward node.

Referring now to FIG. 9, FIG. 9 is a functional block diagram of store and forward node 104 according to some embodiments of the invention. As shown, store and forward node 104 may comprise a data processing system 902 (e.g., one or more microprocessors), a data storage system 906 (e.g., one or more non-volatile storage devices) and computer software 908 stored on the storage system 906. Configuration parameters 910 (e.g., the queue management parameters) may also be stored in storage system 906. Store and forward node also includes transmit/receive (Tx/Rx) circuitry 904 for transmitting data to and receiving data from senders and receivers in the network 102, and transmit/receive (Tx/Rx) circuitry 905 for transmitting data to and receiving data from senders and receivers in the network 106.

The software 908 is configured such that when the processor 902 executes the software 908, the store and forward node 104 performs steps described herein (e.g., steps described above with reference to the flow charts shown in FIGS. 5, 7 and 8). For example, the software 908 may include: (1) computer instructions for initializing a queue and a queue manager; (2) computer instructions for controlling a queue manager and dropping packets from a queue using one or more queue management parameters; (3) computer instructions for detecting one or more predetermined events that correlate with inferred state changes in a sender; (4) computer instructions for altering the state of the queue manager including changing one or more of the queue management parameters.

While various embodiments of the present invention have been described above, it should be understood that they have been presented by way of example only, and not limitation. Thus, the breadth and scope of the present invention should not be limited by any of the above described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A queue management method, comprising:
    setting a packet age threshold equal to a first value;
    while the packet age threshold is equal to the first value, using the packet age threshold in a queue management process for managing a queue for queuing packets transmitted from a communication device;
    in response to the detection of a first predetermined event, setting the packet age threshold equal to a second value, wherein the step of detecting, the first predetermined event comprises one or more of:
        (a) detecting that a packet transmission process executing in the communication device has transitioned from a first state to a second state,
        (b) detecting an event that suggests the packet transmission process has transitioned from the first state to the second state,
        (c) detecting that the packet transmission process will transition from the first state to the second state, and
        (d) detecting an event that suggests the packet transmission process will transition from the first state to the second state;
    while the packet age threshold is equal to the second value, using the packet age threshold in the queue management process for managing the queue;

in response to the detection of a second predetermined event, setting the packet age threshold equal to the first value; and after the detection of the second predetermined event and while the packet age threshold is equal to the first value, using the packet age threshold in the queue management process, wherein the step of detecting the second predetermined event comprises one or more of:
(a) detecting that the packet transmission process has transitioned back to the first state;
(b) detecting an event that suggests the packet transmission process has transitioned back to the first state;
(c) detecting that the packet transmission process will transition back to the first state; and
(d) detecting an event that suggests the packet transmission process will transition back to the first state, and wherein the step of detecting an event that suggests the packet transmission process has transitioned back to the first state comprises determining whether the rate at which packets are arriving at the queue is increasing exponentially.

2. A queue management method, comprising: setting a first queue management parameter equal to a first value;

while the first queue management parameter is equal to the first value, using the first queue management parameter in a queue management process for managing a queue for queuing packets transmitted from a communication device;

in response to the detection of a first predetermined event, setting the first queue management parameter equal to a second value, wherein the step of detecting the first predetermined event comprises one or more of:
(a) detecting that a packet transmission process executing in the communication device has transitioned from a first state to a second state,
(b) detecting an event that suggests the packet transmission process has transitioned from the first state to the second state,
(c) detecting that the packet transmission process will transition from the first state to the second state, and
(d) detecting an event that suggests the packet transmission process will transition from the first state to the second state; and while the first queue management parameter is equal to the second value, using the first queue management parameter in the queue management process for managing the queue, wherein the method further comprises initializing the queue, wherein the step of initializing the queue comprises (i) setting a second queue management parameter equal to a third value and (ii) setting a third queue management parameter equal to a fourth value, and the method further comprises while the first queue management parameter is equal to the first value, the second queue management parameter is equal to the third value, and the third queue management parameter is equal to the fourth value, using the first, second and third queue management parameters in deciding whether a packet in the queue should be dropped from the queue;

in response to the detection of the first predetermined event, setting the second queue management parameter equal to a fifth value and setting the third queue management parameter equal to a sixth value; and while the first queue management parameter is equal to the second value, the second queue management parameter is equal to the fifth value, and the third queue management parameter is equal to the sixth value, using the first, second and third queue management parameters in deciding whether a packet in the queue should be dropped from the queue.

3. The queue management method of claim 2, wherein the second value is greater than the first value.

4. The queue management method of claim 2, wherein the second value is greater than one and a half times the first value.

5. The queue management method of claim 2, wherein the step of detecting an event that suggests the packet transmission process will transition from the first state to the second state comprises determining whether a packet has been dropped from the queue.

6. The queue management method of claim 2, wherein the step of detecting an event that suggests the packet transmission process has transitioned from the first state to the second state comprises determining whether the rate at which packets are arriving at the queue is increasing linearly.

7. The queue management method of claim 2, further comprising:
in response to the detection of a second predetermined event, setting the first queue management parameter equal to the first value; and
after the detection of the second predetermined event and while the first queue management parameter is equal to the first value, using the first queue management parameter in the queue management process.

8. The queue management method of claim 7, wherein the step of detecting the second predetermined event comprises one or more of:
(a) detecting that the packet transmission process has transitioned back to the first state;
(b) detecting an event that suggests the packet transmission process has transitioned back to the first state;
(c) detecting that the packet transmission process will transition back to the first state; and
(d) detecting an event that suggests the packet transmission process will transition back to the first state.

9. The queue management method of claim 8, wherein the step of detecting an event that suggests the packet transmission process has transitioned back to the first state comprises detecting a certain amount of queue inactivity.

10. The queue management method of claim 2, wherein the step of using the first queue management parameter in the queue management process comprises using the first queue management parameter in deciding whether a particular packet in the queue should be dropped from the queue, wherein the particular packet comprises a Transmission Control Protocol (TCP) segment.

11. The queue management method of claim 10, wherein the step of using the first queue management parameter in deciding whether a packet in the queue should be dropped from the queue comprises: (i) determining a time value representing the length of time the packet has been in the queue and (ii) comparing the time value to the value of the first queue management parameter.

12. The queue management method of claim 11, further comprising dropping the packet from the queue in response to the result of the comparing step indicating that the time value is greater than the value of the first queue management parameter.

13. The queue management method of claim 2, wherein the packets transmitted from the communication device are transmission control protocol (TCP) packets.

14. The queue management method of claim 2, further comprising:
  in response to the detection of a second predetermined event, setting the first queue management parameter equal to a seventh value; and
  after the detection of the second predetermined event and while the first queue management parameter is equal to the seventh value, using the first queue management parameter in the queue management process.

15. The queue management method of claim 14, wherein the step of detecting the second predetermined event comprises one or more of:
  (a) detecting that the packet transmission process has transitioned from the second state to a third state,
  (b) detecting an event that suggests the packet transmission process has transitioned from the second state to a third state,
  (c) detecting that the packet transmission process will transition from the second state to a third state, and
  (d) detecting an event that suggests the packet transmission process will transition from the second state to a third state.

16. A network node for queuing packets, comprising:
  a packet queue for storing packets; and
  a queue manager configured to manage the queue,
  wherein the queue manager is configured to:
  (a) set a first queue management parameter equal to a first value;
  (b) use the first queue management parameter in a queue management process for managing a queue for queuing packets transmitted .from a communication device while the first queue management parameter is equal to the first value;
  (c) set the first queue management parameter equal to a second value in response to the detection of a first predetermined event, wherein the queue manager is configured to detect the first predetermined event by:
    (1) detecting that a packet transmission process executing in the communication device has transitioned from a first state to a second state,
    (2) detecting an event that suggests the packet transmission process has transitioned from the first state to the second state,
    (3) detecting that the packet transmission process will transition from the first state to the second state, and/or
    (4) detecting an event that suggests the packet transmission process will transition from the first state to the second state; and
  (d) use the first queue management parameter in the queue management process while the first queue management parameter is equal to the second value, wherein the queue manager is configured to (i) set a second queue management parameter equal to a third value and (ii) set a third queue management parameter equal to a fourth value as part of a queue initialization process, and
  the queue manager is further configured to:
  use the first, second and third queue management parameters in deciding whether a packet in the queue should be dropped from the queue while the first queue management parameter is equal to the first value, the second queue management parameter is equal to the third value, and the third queue management parameter is equal to the fourth value;
  set the second queue management parameter equal to a fifth value and set the third queue management parameter equal to a sixth value in response to the detection of the first predetermined event; and
  use the first, second and third queue management parameters in deciding whether a packet in the queue should be dropped from the queue while the first queue management parameter is equal to the second value, the second queue management parameter is equal to the fifth value, and the third queue management parameter is equal to the sixth value.

17. The network node of claim 16, wherein the second value is greater than the first value.

18. The network node of claim 16, wherein the second value is greater than one and a half times the first value.

19. The network node of claim 16, wherein the queue manager is configured to detect an event that suggests the packet transmission process will transition from the first state to the second state by determining whether a packet has been dropped from the queue.

20. The network node of claim 16, wherein the queue manager is further configured to:
  set the first queue management parameter equal to the first value in response to the detection of a second predetermined event; and
  use the first queue management parameter in the queue management process after the detection of the second predetermined event and while the first queue management parameter is equal to the first value.

21. The network node of claim 20, wherein the queue manager is configured to detect the second predetermined event by:
  (a) detecting that the packet transmission process has transitioned back to the first state,
  (b) detecting an event that suggests the packet transmission process has transitioned back to the first state,
  (c) detecting that the packet transmission process will transition back to the first state, and/or
  (d) detecting an event that suggests the packet transmission process will transition back to the first state.

22. The network node of claim 21, wherein the queue manager is configured to detect an event that suggests the packet transmission process has transitioned back to the first state by detecting a predetermined amount of queue inactivity.

23. The network node of claim 16, wherein the queue manager is configured to use the first queue management parameter in the queue management process by using the first queue management parameter in deciding whether a packet in the queue should be dropped from the queue.

24. The network node of claim 23, wherein the queue manager is configured to use the first queue management parameter in deciding whether a packet in the queue should be dropped from the queue by: (i) determining a time value representing the length of time the packet has been in the queue and (ii) comparing the time value to the value of the first queue management parameter.

25. The network node of claim 24, wherein the queue manager is further configured to drop the packet from the queue in response to the result of the comparing step indicating that the time value is greater than the value of the first queue management parameter.

26. The network node of claim 16, wherein the packets transmitted from the communication device are transmission control protocol (TCP) packets.

27. The network node of claim 16, wherein the queue manager is further configured to:

set the first queue management parameter to a seventh value in response to the detection of a second predetermined event; and use the first queue management parameter in the queue management process after the detection of the second predetermined event and while the first queue management parameter is equal to the seventh value.

28. The network node of claim 27, wherein the queue manager is configured to detect the second predetermined event by:
(a) detecting that the packet transmission process has transitioned from the second state to a third state,
(b) detecting an event that suggests the packet transmission process has transitioned from the second state to a third state,
(c) detecting that the packet transmission process will transition from the second state to a third state, and/or
(d) detecting an event that suggests the packet transmission process will transition from the second state to a third state.

29. A computer program product comprising a non-transitory computer usable medium having a computer readable program code embodied therein, said computer readable program code adapted to be executed to implement a method for managing a queue, said method comprising:
setting a first queue management parameter equal to a first value;
while the first queue management parameter is equal to the first value, using the first queue management parameter in a queue management process for managing a queue for queuing packets transmitted from a communication device;
in response to the detection of a first predetermined event, setting the first queue management parameter equal to a second value, wherein detecting the first predetermined event comprises one or more of:
(a) detecting that a packet transmission process executing in the communication device has transitioned from a first state to a second state,
(b) detecting an event that suggests the packet transmission process has transitioned from the first state to the second state,
(c) detecting that the packet transmission process will transition from the first state to the second state, and
(d) detecting an event that suggests the packet transmission process will transition from the first state to the second state; and
while the first queue management parameter is equal to the second value, using the first queue management parameter in the queue management process for managing the queue, wherein
the method further comprises (i) setting a second queue management parameter equal to a third value and (ii) setting a third queue management parameter equal to a fourth value, and the method further comprises
using the first, second and third queue management parameters in deciding whether a packet in the queue should be dropped from the queue while the first queue management parameter is equal to the first value, the second queue management parameter is equal to the third value, and the third queue management parameter is equal to the fourth value;
setting the second queue management parameter equal to a fifth value and setting the third queue management parameter equal to a sixth value in response to the detection of the first predetermined event; and using the first, second and third queue management parameters in deciding whether a packet in the queue should be dropped from the queue while the first queue management parameter is equal to the second value, the second queue management parameter is equal to the fifth value, and the third queue management parameter is equal to the sixth value.

30. The computer program product of claim 29, wherein the second value is greater than the first value.

31. The computer program product of claim 29, wherein the second value is greater than one and a half times the first value.

32. The computer program product of claim 31, wherein the step of using the first queue management parameter in the queue management process comprises using the first queue management parameter in deciding whether a packet in the queue should be dropped from the queue.

33. The computer program product of claim 32, wherein the step of using the first queue management parameter in deciding whether a packet in the queue should be dropped from the queue comprises: (i) determining a time value representing the length of time the packet has been in the queue and (ii) comparing the time value to the value of the first queue management parameter.

34. The computer program product of claim 33, wherein the method further comprises dropping the packet from the queue in response to the result of the comparing step indicating that the time value is greater than the value of the first queue management parameter.

35. The computer program product of claim 29, wherein the step of detecting an event that suggests the packet transmission process will transition from the first state to the second state comprises determining whether a packet has been dropped from the queue.

36. The computer program product of claim 29, wherein the method further comprises:
setting the first queue management parameter equal to the first value in response to the detection of a second predetermined event; and
using the first queue management parameter in the queue management process after the detection of the second predetermined event and while the first queue management parameter is equal to the first value.

37. The computer program product of claim 36, wherein the step of detecting the second predetermined event comprises one or more of:
(a) detecting that the packet transmission process has transitioned back to the first state,
(b) detecting an event that suggests the packet transmission process has transitioned back to the first state,
(c) detecting that the packet transmission process will transition back to the first state, and
(d) detecting an event that suggests the packet transmission process will transition back to the first state.

38. The computer program product of claim 37, wherein the step of detecting an event that suggests the packet transmission process has transitioned from the second state to the first state comprises detecting a certain amount of queue inactivity.

39. The computer program product of claim 29, further comprising: in response to the detection of a second predetermined event, setting the first queue management parameter equal to a seventh value; and after the detection of the second predetermined event and while the first queue management parameter is equal to the seventh value, using the first queue management parameter in the queue management process.

40. The computer program product of claim 39, wherein the step of detecting the second predetermined event comprises one or more of:
 (a) detecting that the packet transmission process has transitioned from the second state to a third state,
 (b) detecting an event that suggests the packet transmission process has transitioned from the second state to a third state,
 (c) detecting that the packet transmission process will transition from the second state to a third state, and
 (d) detecting an event that suggests the packet transmission process will transition from the second state to a third state.

* * * * *

UNITED STATES PATENT AND TRADEMARK OFFICE
CERTIFICATE OF CORRECTION

PATENT NO. : 8,565,249 B2  
APPLICATION NO. : 12/368723  
DATED : October 22, 2013  
INVENTOR(S) : Isaksson et al.

Page 1 of 1

It is certified that error appears in the above-identified patent and that said Letters Patent is hereby corrected as shown below:

On the Title Page, Item (57), under "ABSTRACT", in Column 2, Line 9, delete "is;" and insert -- is --, therefor.

On the Title Page, Item (57), under "ABSTRACT", in Column 2, Line 10, delete "sn tate" and insert -- state --, therefor.

In the Claims

In Column 10, Line 52, in Claim 1, delete "detecting, the" and insert -- detecting the --, therefor.

In Column 11, Line 54, in Claim 2, delete "comprises" and insert -- comprises: --, therefor.

In Column 13, Line 32, in Claim 16, delete "transmitted .from" and insert -- transmitted from --, therefor.

In Column 15, Line 56, in Claim 29, delete "comprises" and insert -- comprises: --, therefor.

Signed and Sealed this  
Twenty-second Day of April, 2014

Michelle K. Lee  
*Deputy Director of the United States Patent and Trademark Office*